(12) United States Patent
Chen et al.

(10) Patent No.: US 10,871,407 B2
(45) Date of Patent: Dec. 22, 2020

(54) SENSOR ASSEMBLIES WITH MULTIRANGE CONSTRUCTION

(71) Applicant: Measurement Specialties, Inc., Hampton, VA (US)

(72) Inventors: Ya-Mei Chen, Fremont, CA (US); James Hoffman, Santa Clara, CA (US)

(73) Assignee: MEASUREMENT SPECIALTIES, INC., Hampton, VA (US)

( * ) Notice: Subject to any disclaimer, the term of this patent is extended or adjusted under 35 U.S.C. 154(b) by 0 days.

(21) Appl. No.: 16/395,095

(22) Filed: Apr. 25, 2019

(65) Prior Publication Data

US 2020/0340869 A1    Oct. 29, 2020

(51) Int. Cl.
  *G01L 1/00*   (2006.01)
  *G01L 1/18*   (2006.01)
  *G01L 9/00*   (2006.01)

(52) U.S. Cl.
  CPC .............. *G01L 1/18* (2013.01); *G01L 9/0042* (2013.01); *G01L 9/0073* (2013.01)

(58) Field of Classification Search
  CPC ......... H01L 2924/0002; H01L 2924/00; H01L 23/10; G01L 13/18; G01L 9/0073; G01L 9/0042; B81B 2201/0264
  USPC .................................................... 73/862.638
  See application file for complete search history.

(56) References Cited

U.S. PATENT DOCUMENTS

| | | | |
|---|---|---|---|
| 4,121,334 A | 10/1978 | Wallis | |
| 4,625,561 A * | 12/1986 | Mikkor | G01L 9/0073 29/25.41 |
| 5,323,656 A * | 6/1994 | Fung | G01L 9/0073 29/25.41 |
| 5,553,506 A * | 9/1996 | Benz | G01L 9/0019 73/862.59 |
| 7,242,089 B2 * | 7/2007 | Minervini | B81B 7/0064 257/704 |
| 9,731,961 B2 * | 8/2017 | Lloyd | B81B 7/0054 |
| 10,036,676 B1 | 7/2018 | Bradley et al. | |
| 2003/0017712 A1 * | 1/2003 | Brendel | H01L 31/056 438/758 |
| 2007/0275494 A1 * | 11/2007 | Mayer | B81C 1/00238 438/50 |
| 2007/0275495 A1 * | 11/2007 | Mayer | H01L 23/10 438/50 |

(Continued)

*Primary Examiner* — Max H Noori
*Assistant Examiner* — Masoud H Noori

(57) ABSTRACT

Sensor devices comprise a sensor die having a first membrane between a first outside surface and a buried cavity, and a second membrane between the buried cavity and a recessed section of the sensor die forming a backside cavity, wherein the first and second membranes oriented vertically adjacent one another. The sensor die comprises first and second members that are attached together, the buried cavity is formed between the members, and the first member comprises the first diaphragm and the second member comprises the second diaphragm. The membranes are configured to enable sensing over different ranges. Electrical sensing elements are in the sensor die for measuring movement of each of the first and second sensing membranes over the different ranges. Electrical contacts connected with sensing elements are exposed along a sensor die surface for providing an output signal for monitoring by an external device.

20 Claims, 5 Drawing Sheets

(56) References Cited

U.S. PATENT DOCUMENTS

2008/0220216 A1* 9/2008 Unger ................ B81C 1/00119
428/172

* cited by examiner

SENSOR ASSEMBLIES WITH MULTIRANGE CONSTRUCTION

FIELD

Sensor assemblies or devices as disclosed herein relate to sensors comprising a sensor membrane or diaphragm that deflects in response to an applied force and which deflection is measured for purposes of determining the amount of an external force imposed thereon and, more specifically, sensor assemblies that are specially configured to provide a desired sensitivity over different ranges of externally applied forces.

BACKGROUND

The use of sensor assemblies for purposes of determining an amount of force that is imposed upon a sensor element, diaphragm or membrane is known in the art. For purposes of determining an amount of a force imposed by a physical element, force sensors are used. Conventional force sensors comprise a force sensor die that includes a diaphragm and electrical sensing elements connected therewith, and an actuation element that is made separately from the sensor die and that is combined with the sensor die such that the actuation element contacts a section of the diaphragm. The actuation element extends from the force sensor to receive an external force that is then transmitted by the actuation element onto the diaphragm of the sensor die, causing the diaphragm to deflect, which deflection is measured by the electrical sensing elements that are then used to provide an output than is used to determine the external force.

Such known force sensors include those having a buried cavity design, where the diaphragm or membrane may extend from a surface of the sensor die to a buried cavity, and when an external force is imposed onto the diaphragm surface this causes the diaphragm to deflect into the buried cavity. Other known force sensors have a backside cavity design, where the diaphragm or membrane may extend from a surface of the sensor die to a backside cavity, and when an external force is imposed onto the diaphragm surface this causes the diaphragm to deflect into the backside cavity. A feature of such known force sensor design is that the range of external force that can be accurately determined is limited both by the operating deflection range of the diaphragm and the sensitivity of the diaphragm in detecting the force imposed therein. For each of these types of known sensors, the range of external force that can be accurately measured is thereby limited.

In certain use applications there is a need to determine the external force over a broad range that is outside of the capabilities of such known force sensors, e.g., beyond an operating condition where the diaphragm or membrane has reached total deflection and thus is no longer capable of providing force measurement information. It is, therefore, desired that sensor assemblies be constructed in a manner that enable measurement of external forces over multiple ranges, e.g., when subjected to low and high force conditions. It is desired that such sensor assemblies be constructed in a manner that enables customization for purposes of tailoring the multirange force detection capabilities to the specific end-use application, e.g., where different degrees of sensitivity may be desired at one region of range as compared to another region of the range.

SUMMARY

Sensor devices as disclosed herein generally comprise a sensor die that includes a first membrane disposed between a first outside surface of the sensor die and a buried cavity in the sensor die extending a depth from the outside surface. The sensor die further includes a second membrane disposed between the buried cavity and a recessed section of a second outside surface of the sensor die that is opposite the first outside surface. In an example, the sensor die comprises a first member and a second member that are attached together, wherein the buried cavity is formed between the first and second members, and wherein the first membrane is integral with the first member. In an example, the second membrane is integral with the second member. The first membrane may be sized having a length that is different from that of the second membrane. The first membrane may have a thickness that is different from a thickness of the second membrane. The sensor die also includes electrical sensing elements disposed therein for measuring movement of the first and second sensing membranes. In an example, the electrical sensing elements are disposed within a region of the sensor die that is interposed between the first outside surface and the buried cavity. In an example, the electrical sensing elements comprise a first set of electrical sensing elements positioned adjacent the first membrane, and a second set of electrical sensing elements positioned adjacent the second membrane. The sensor device further comprises electrical contacts exposed along the first outside surface of the sensor die that are electrically connected with the electrical sensing elements. In an example, the sensor device is a force sensor.

A method using the sensor device for determining a forced imposed therein comprises subjecting an external force onto a region of the sensor device occupied by the first sensing membrane, and wherein the second sensing membrane is disposed vertically below the first sensing membrane. The force imposed onto the sensor device causes the first sensing membrane to deflect and, in some cases, the second sensing membrane to also deflect, wherein the amount of deflection of each sensing membrane is measured by the respective electrical sensing elements. The electrical sensing elements provide an output signal that is transferred by electrical connectors outside of the sensor device for determining the amount of force by an external device that is electrically connected with the sensor device. In an example, the first membrane is configured to detect external forces within a first range of external force amounts, and the second membrane is configured to detect external forces within a second range of external force amounts that are different from the first range of external force amounts.

BRIEF DESCRIPTION OF THE DRAWINGS

Sensor assemblies as disclosed herein will now be described by way of example with reference to the accompanying Figures, of which.

DETAILED DESCRIPTION

Figure 1A:
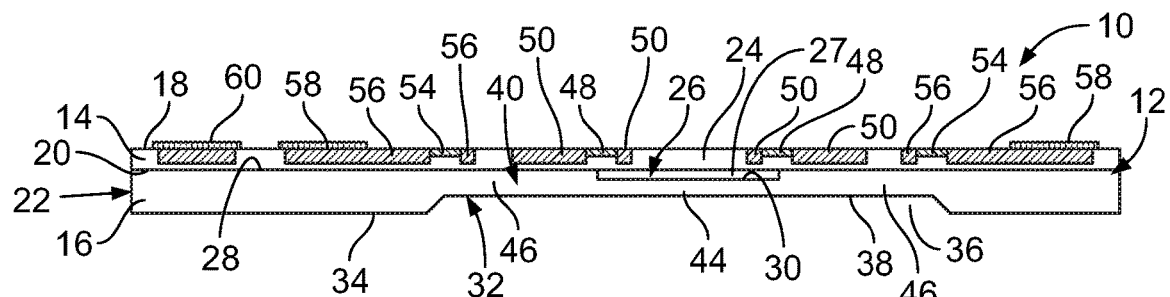
FIG. 1A is a cross-sectional side view of an example sensor assembly as disclosed herein.

Embodiments of sensor assemblies or devices will be described hereinafter in detail with reference to the attached drawings, wherein like reference numerals refer to the like elements. Sensor assemblies as disclosed herein may, however, be embodied in many different forms and for different types of uses and should not be construed as being limited to the embodiments set forth herein; rather, these embodiments are provided so that the disclosure will be thorough and complete, and will fully convey the concept of sensor assemblies to those skilled in the art. Sensor assemblies as disclosed herein may be used in applications where a force imposed thereon by a physical object is being measured, wherein such sensor assemblies may be referred to as force sensors. However, it is to be understood that the sensor assemblies as disclosed herein may be used for other types of force registering/monitoring applications other than ones where a force from a physical object is being imposed thereon for measurement, such as pressure sensor applications where a fluid pressure or the like is being monitored.

FIG. 1A illustrates an example sensor device or assembly 10 as disclosed herein comprising a sensor die 12. In an example, the sensor die 12 may be formed from two sensor die members 14 and 16 that are attached or bonded together. In an example, the first and second sensor die members are formed from silicon and are directly bonded together. The sensor die first member 14 has a thickness extending between an outer surface 18 to an underside surface 20, and as best shown looking along an edge 22 of sensor die. The sensor die 12 comprises a first diaphragm or membrane 24 that is integral with the first member and that has a thickness defined by the thickness of the first member. In an example, the first membrane thickness may be greater than about 2 micrometers, and from about 5 to 50 micrometers. It is to be understood that the exact thickness of the membrane may vary depending on the particular end-use application and/or the desired sensitivity of the first membrane.

The sensor die second member 16 includes a recessed section 26 that may be formed in the second member before attachment with the first member by an etching process or the like as better described below. The recessed section 26 is positioned directly opposite the first membrane 24 and provides a buried cavity 27 within the sensor die for the membrane to deflect therein in response to an external force. The buried cavity may or may not be vented to an external environment. If vented, the venting can be provided through a port extending from the buried cavity through a desired section of the sensor die.

For example, in an example where the buried cavity is not vented, the sensor assembly may be used to measure a pressure. In an example where the buried cavity is vented, the sensor assembly may be used to measure an physical force. In an example, the buried cavity is vented and such venting may take place for example through port extending from the buried cavity. The depth of the recessed section 26, as measured from an underside surface 28 of the second member to a closed section 30 of the buried cavity may be greater than about 0.5 micrometers, and from about 1 to 10 micrometers. It is to be understood that the exact depth of the recessed section may vary depending on such factors as the thickness of the first membrane 24 as well as the particular end-use application and/or the desired degree of deflection of the first membrane. As described below, the length of the recessed section or buried cavity will vary on the particular end use of the sensor assembly, e.g., to provide a desired degree of force sensitivity at relatively low forces.

The sensor die second member 16 comprises a recessed section 32 that is disposed along an outer surface 34 of the second member and that forms a backside cavity 36. The backside cavity 36 is positioned opposite the buried cavity 27. In an example, the recessed section 32 is sized to provide a desired second membrane thickness for a particular sensor device end-use application, which thickness may define or contribute to the sensitivity characteristics of the second membrane.

In this example, the buried cavity 27 extends a length within the sensor die that is less that the length of the backside cavity 36, wherein the buried cavity and backside cavity are both vertically aligned with each other along a common vertical axis extending through the thickness of the sensor die. The sensor die includes a second diaphragm or membrane 40 that is integral with the sensor die and that extends from the closed section 38 of the backside cavity to the underside surface 28 of the second member. The second membrane 40 includes a center section 44 that extends along the length of the buried cavity 27, and end sections 46 that each extend from respective edges of the buried cavity to respective edges of the backside cavity, wherein the thickness of the second membrane central section is less than that of the second membrane end sections. In an example, the second membrane has a center section 44 that may have a thickness greater than about 5 micrometers, and from about 10 to 500 micrometers. In an example, the second membrane has an end section thickness that may be greater than about 5 micrometers, and from about 50 to 550 micrometers. It is to be understood that the exact thickness of the second membrane center section and end sections may vary depending on such factors as the thickness of the first membrane, the overall thickness of the second member, and the particular end-use sensor assembly application.

In the example illustrated in FIG. 1A, the buried cavity 27 extends a length along the sensor die that is less than that of the backside cavity 36. In an example, such configuration may be useful in a use applications calling for an increased degree of force sensitivity at lower forces while still receiving force information at a relatively reduced degree of force sensitivity at higher forces.

Figure 1B:
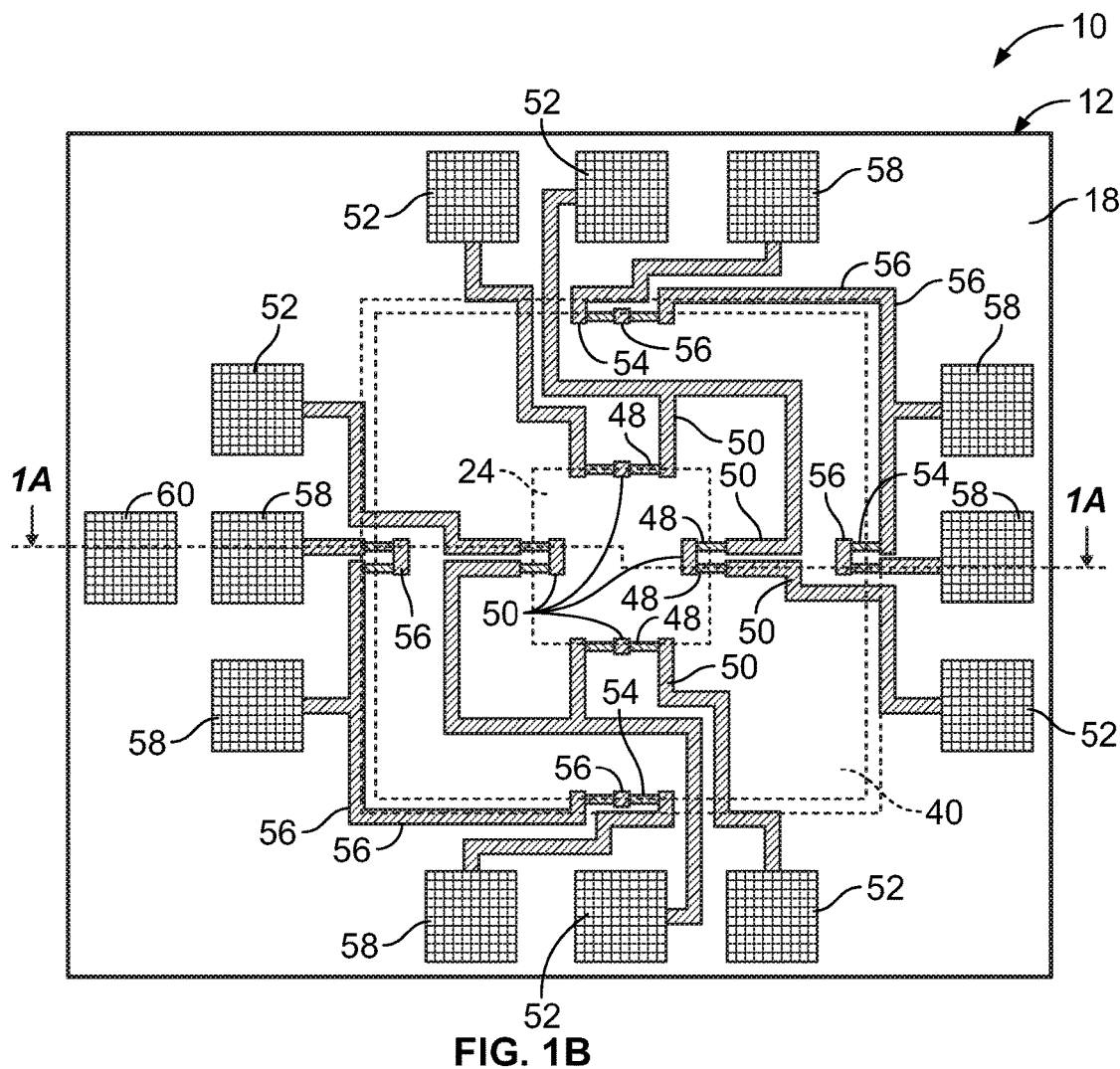
FIG. 1B is a top view of the example sensor assembly of FIG. 1A.

Referring to FIGS. 1A and 1B, the sensor die 12 comprises a first set of electrical sensing elements 48 positioned adjacent a peripheral edge of the first membrane 24 along the outer surface 18 of the sensor die, e.g., the sensor die first member. The first set of electrical sensing elements 48 may be in the form or piezoresistive elements or the like that are arranged in a Wheatstone bridge to detect changes along the first membrane surface in response to an external force being imposed thereon and that provide an electrical signal output for determination of the amount of such force. A first set of electrical connectors 50 extend from the first set of electrical sensing elements 48 to a first set of electrical contacts 52 (shown in FIG. 1B), wherein the electrical connectors 50 and electrical contacts 52 are positioned adjacent the outer surface 50. The sensor die comprises a second set of electrical sensing elements 54 positioned adjacent a peripheral edge of the second membrane 40 along an outer surface 50 of the sensor die, e.g., the sensor die first member. The second set of electrical sensing elements 54 may be in the form or piezoresistive elements or the like that are arranged in a Wheatstone bridge to detect changes along the second membrane surface in response to an external force imposed on the sensor die and that provide an electrical signal output for determination of the amount of such force. A second set of electrical connectors 56 extend from the second set of electrical sensing elements 54 to a second set of electrical contacts 58, wherein the electrical connectors 56 and electrical contacts 58 are positioned adjacent the outer surface 50.

As best shown in FIG. 1B, in this example sensor assembly 10, the first set of electrical sensing elements are positioned in the sensor die 12 concentrically within the placement position of the second set of electrical sensing elements, corresponding to the peripheral edges of the respective first and second membranes. The electrical contacts 52 and 58 are positioned outwardly from the second set of electrical sensing elements and are configured to facilitate electrical connection with an electrical terminals of an external device, e.g., for receiving the electrical signals generated by the electrical sensing elements and making a force determination therefrom. The sensor may include one or more other electrical contacts 60 for purpose of applying a voltage bias to the silicon substrate, or for other sensor operating purposes.

Figure 1C:
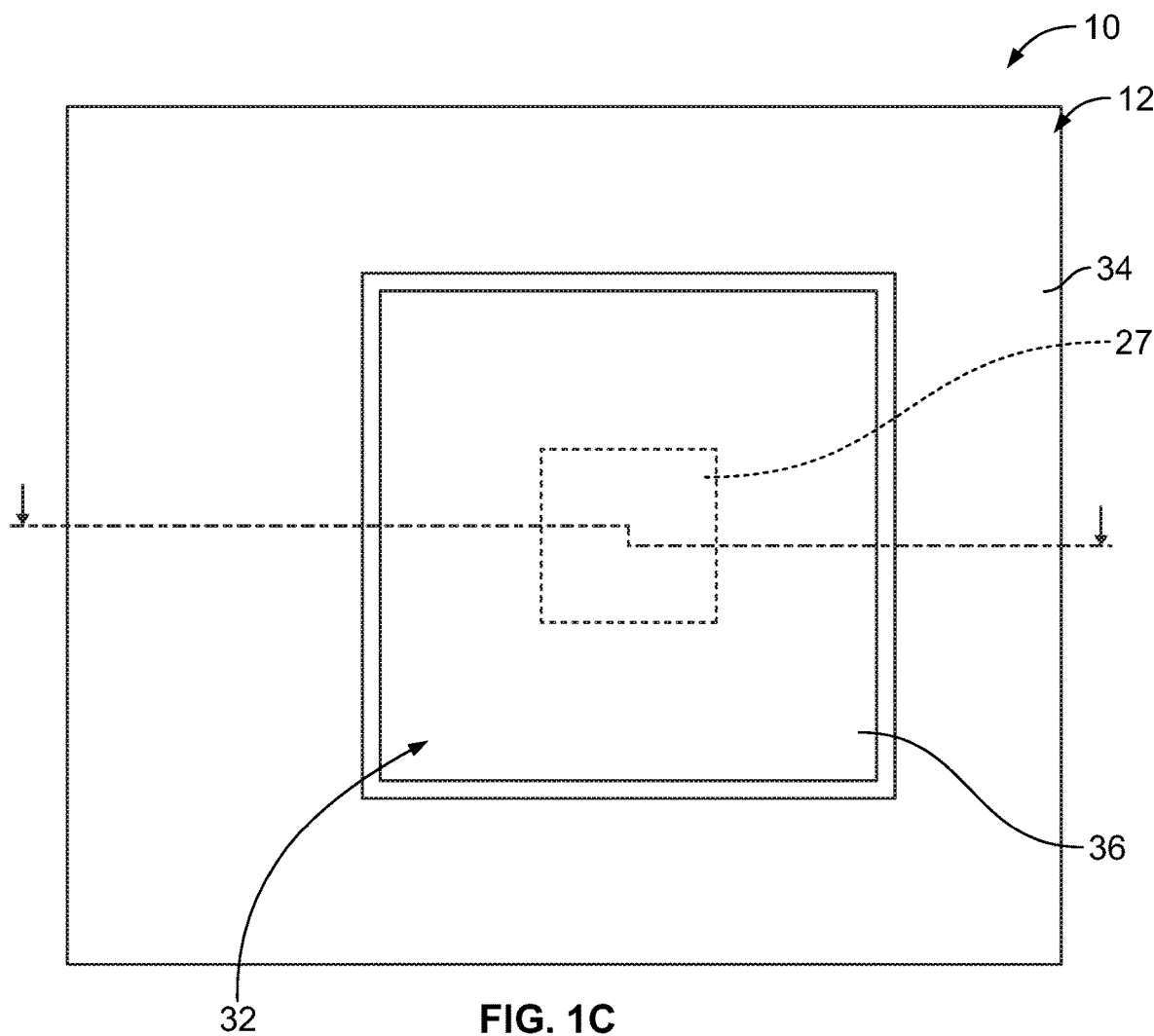
FIG. 1C is a bottom view of the example sensor assembly FIG. 1A.

FIG. 1C illustrates bottom view of the sensor assembly 10 sensor die 12, showing the sensor die second member outer surface 34 and the backside cavity 36 formed from the recessed section 32. Also shown is the relative position of the buried cavity 27 relative to the backside cavity.

In an example, the sensor assembly as disclosed herein and illustrated in FIGS. 1A to 1C may be made by forming the recessed section 32 in the sensor die second member 16, and then bonding the second member 16 to the first member 14 to thereby form the buried cavity 27 therebetween. The first member outer surface 50 is treated with dopant diffusion or ion implantation for forming the first and second sets of electrical sensing elements 48 and 54, electrical connectors 50 and 56, and electrical contacts 52 and 58. The recessed section 32 is then formed along the second member outer surface 34 to provide the backside cavity 36. This is but one example of how sensor assemblies as disclosed herein, and it is to be understood that such sensor assemblies may be formed according to different steps or procedures while being within the scope of the method of making as disclosed herein.

Figure 2A:
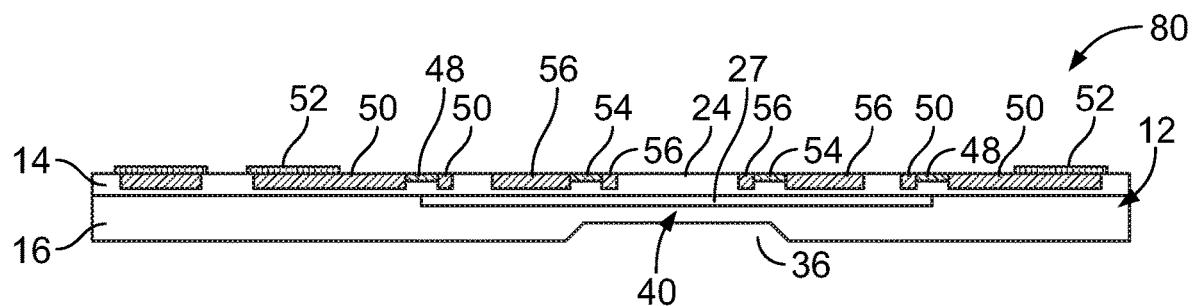
FIG. 2A is a cross-sectional side view of an example sensor assembly as disclosed herein.
Figure 2B:
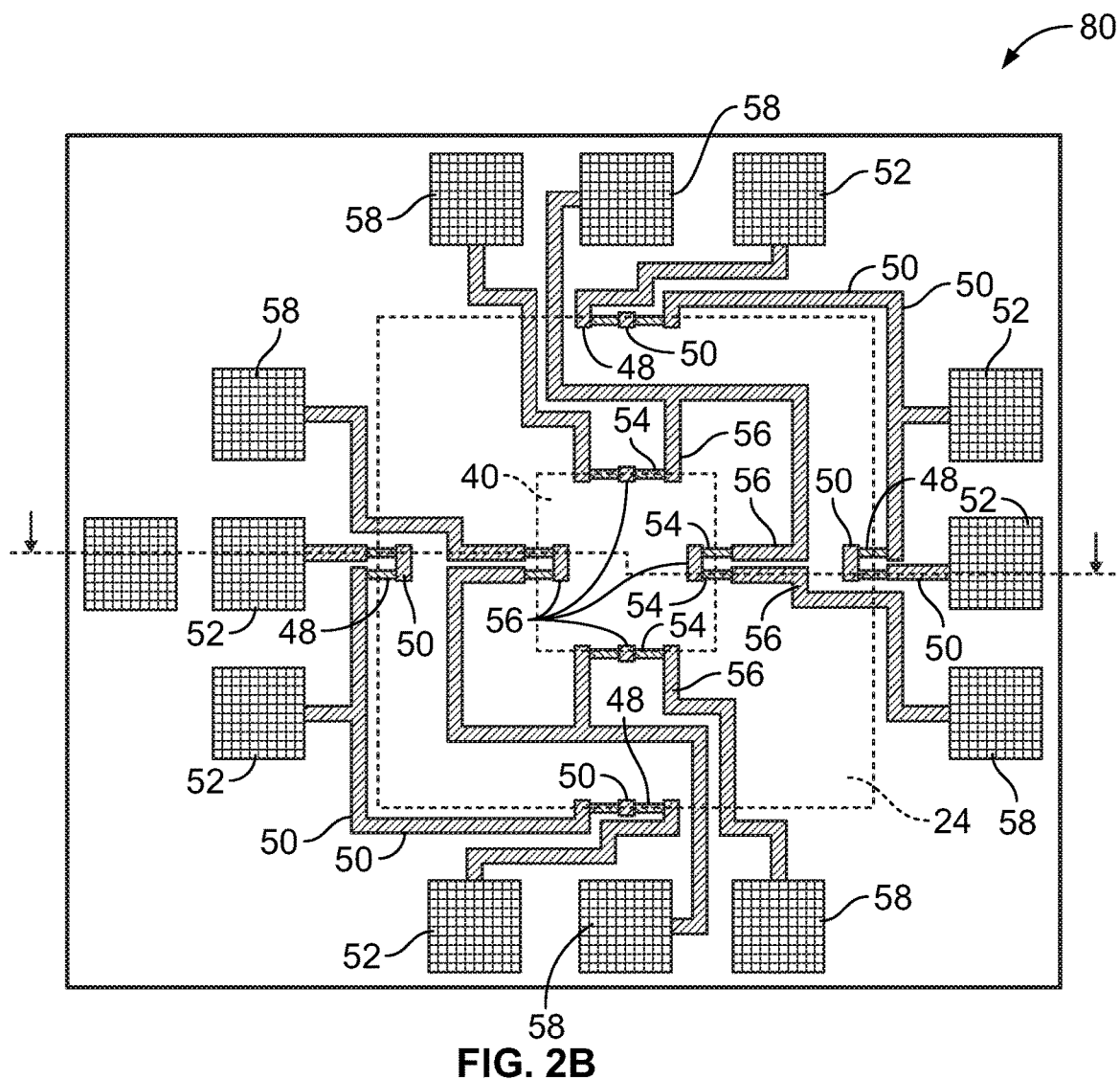
FIG. 2B is a top view of the example sensor assembly of FIG. 2A.

FIGS. 2A and 2B illustrates an example sensor assembly 80 as disclosed herein that comprises the same elements as that described above for the sensor assembly of FIGS. 1A to 1B, such as the sensor die 12 comprising the first and second members 14 and 16, the first membrane 24, the buried cavity 27, the backside cavity 36 the second membrane 40, the first and second sets of electrical sensing elements 48 and 54, first and second sets of electrical connectors 50 and 56, and the first and second sets of electrical contacts 52 and 58 (shown in FIG. 2B). However, unlike the example of FIGS. 1A to 1C, the buried cavity 27 is configured having a length within the sensor die that is greater than that of the backside cavity 36, such that the first membrane 24 is configured having a length that is greater than the second membrane 40. Such example sensor assembly may be configured in this manner for the purpose of providing relatively greater degree of force sensitivity and accurate force measurements for relatively low amounts of imposed force, through the configuration of the enlarged first membrane, and a relatively lesser degree of force sensitivity and accurate force measurements at relatively higher amounts of imposed force, through the configuration of the reduced size second membrane.

As best shown in FIG. 2B, for this example sensor assembly 80, the placement position of the first and second sets of electrical sensing elements 48 and 54, and electrical connectors 50 and 56 are also different from that illustrated for the example sensor assembly of FIGS. 1A to 1C, reflecting the change in the peripheral edge placement within the sensor die of the first and second membranes. In this example, the second set of electrical sensing elements 54 and respective electrical connectors 56 are positioned concentrically inwardly of the first set of electrical sensing elements 48 and respective connectors 50 reflecting the placement position of the now reduced size second membrane 40 relative to the now enlarged size first membrane 24. The first and second set of electrical contacts 52 and 58 are positioned outwardly from the first set of electrical sensing elements 48 for making contact electrical with a desired external device.

Figure 3A:
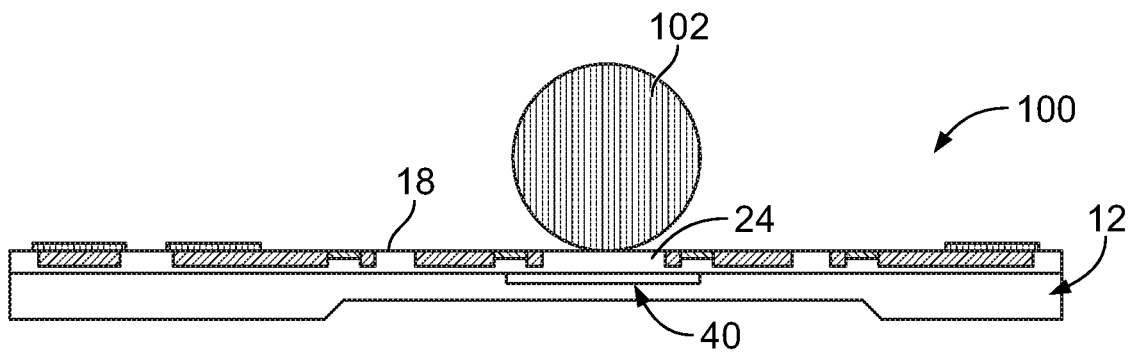
FIG. 3A is a cross-sectional side view of the example sensor assembly of FIG. 1 in a first state.
Figure 3B:
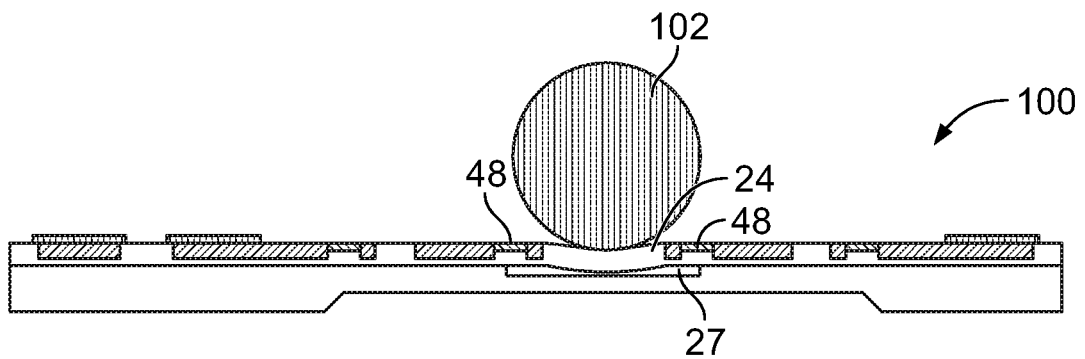
FIG. 3B is a cross-sectional side view of the example sensor assembly of FIG. 1 in a second state.

FIGS. 3A to 3D illustrate the example sensor assembly of FIGS. 1A to 1C at different states relative to an external force being imposed thereof. FIG. 3A show the sensor assembly 100 comprising the sensor die 12 with first and second membranes 24 and 40 with an actuation element 102 disposed on the outer surface 18 and positioned over a central section of the first membrane, and wherein there is no external force imposed on the actuation element. FIG. 3B shows the sensor assembly 100 in a state where a low force load has been imposed on the actuation element 102, which force load has caused the first membrane 24 to deflect a partial depth into the buried cavity 27. In this state, the first set of electrical sensing elements 48 provide an output signal signifying both sensitivity to the force load and providing information from which the amount of the force load can be determined.

Figure 3C:
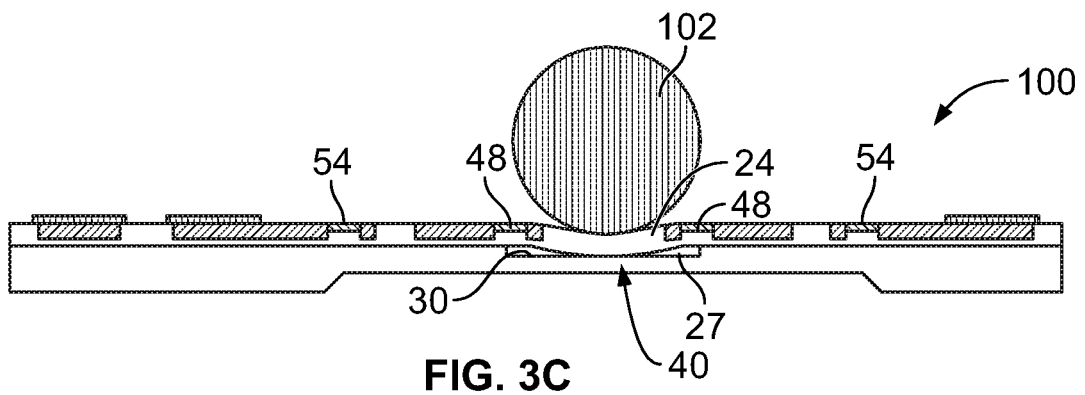
FIG. 3C is a cross-sectional side view of the example sensor assembly of FIG. 1 in a third state.

FIG. 3C shows the sensor assembly 100 in a state where the force load imposed on the actuation element 102 has been increased from the level of FIG. 3B, causing the first membrane 24 to further deflect into the buried cavity 27 to make contact with the closed section 30 of the buried cavity. In this state, further free deflection of the first membrane is hindered so that the first set of electrical sensing elements 48 may not be as sensitive to further force load increase or provide information for accurately determining such imposed force load amount. At this point, the relatively low-force sensing ability of the sensor assembly 100, through the use of the first membrane 24 and related first set of electrical sensing elements 48 is at an upper range, and the monitoring of any further force load is best conducted through the use of the second membrane 40 and related second set of electrical sensor elements 54.

Figure 3D:
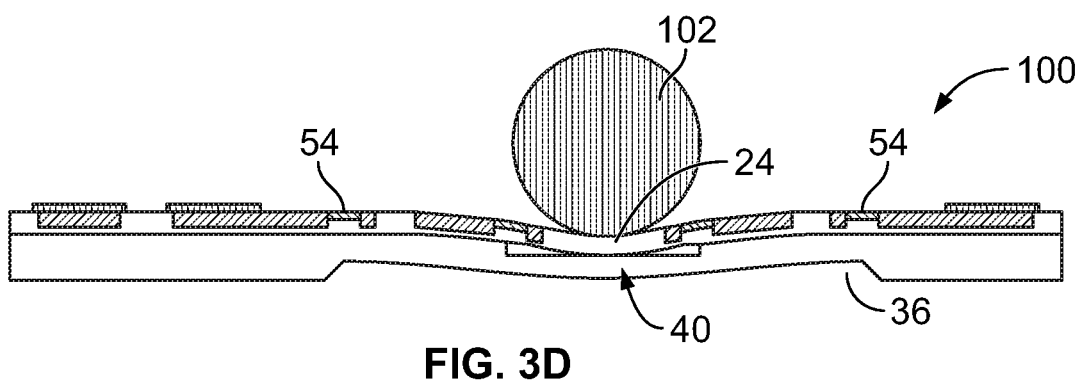
FIG. 3D is a cross-sectional side view of the example sensor assembly of FIG. 1 in a fourth state.

FIG. 3D shows the sensor assembly 100 in a state where the force load imposed on the actuation element 102 has been further increased and is now outside of the low range and in a high range. At this point, the increased load causes the first membrane 24 to further deflect into the second membrane 40, which moves into the backside cavity 36. The second set of electrical sensing elements 54 provide an output signal signifying both sensitivity to the relatively high force load and providing information from which the amount of the high force load can be determined. These figures operate to illustrate how the sensor assembly as disclosed herein operates to provide an improved degree of force sensitively and force determination over low and high ranges of applied forces through the use and configuration of the first and second membranes and related first and second sets of electrical sensing elements.

Figure 4:
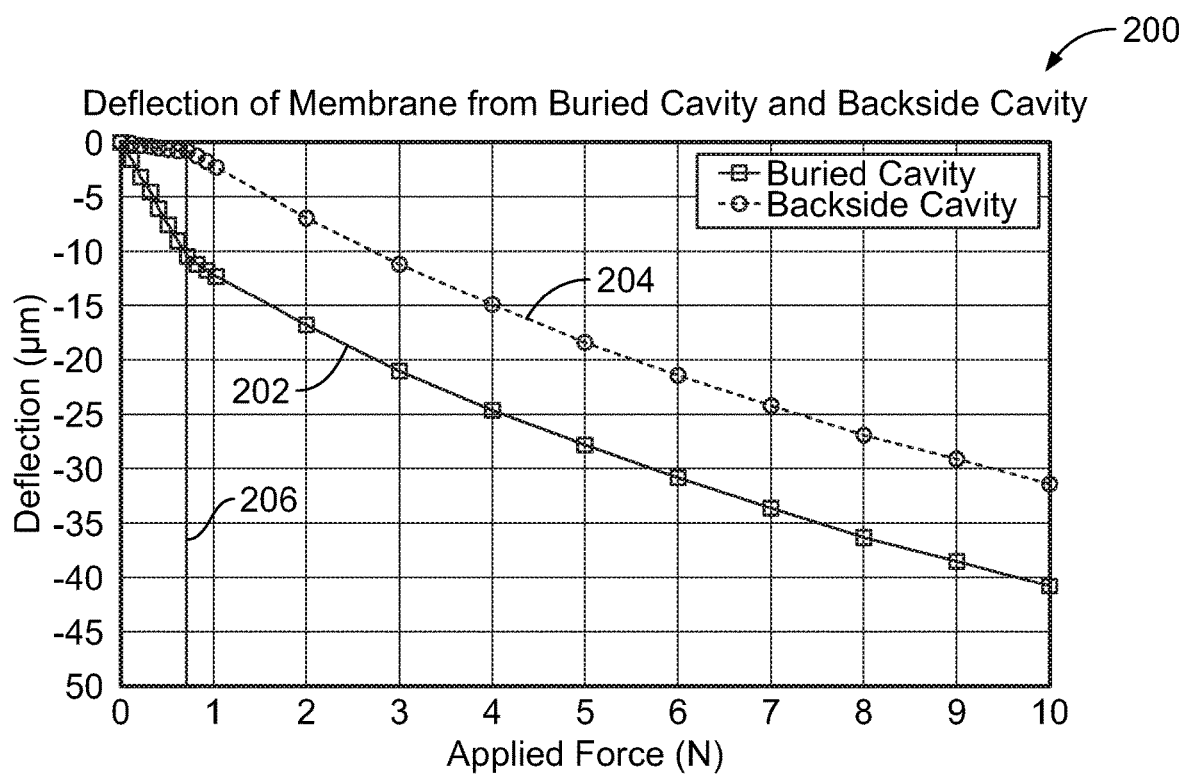
FIG. 4 is a graph that illustrates membrane deflection characteristics as a function of applied force for an example sensor assembly as disclosed herein.

FIG. 4 is a graph 200 that illustrates deflection amounts of the first and second diaphragms or membranes as a function of applied force. The deflection characteristics of the first membrane is shown by plot 202, and the deflection characteristics of the second membrane is shown by plot 204. As illustrated, with increasing applied force starting at zero one can see from plot 202 that the first membrane deflects to a greater degree than the second membrane. There is a point on the graph noted by a vertical line 206 at about 0.7 N that denotes where the first membrane contacts the buried cavity that operates to limit further free deflection of the first membrane (which condition is disclosed above and illustrated in FIG. 3C). Continuing from this point, plot 204 illustrates how the second membrane displays an increased degree of deflection, whereas before such point deflection of the second membrane was marginal. With continued applied force, the plot 204 shows continued deflection of the second membrane. Accordingly, this graph operates to show the sensor assembly first and second membrane deflection characteristics along a range of applied force (in this example from zero to about 0.7 N through the deflection of the first membrane, and from about 0.7 to 10 N through the deflection of the second membrane), thereby operating to accurately provide information for determining the force that is applied thereon across a range of force pressures.

Figure 5:
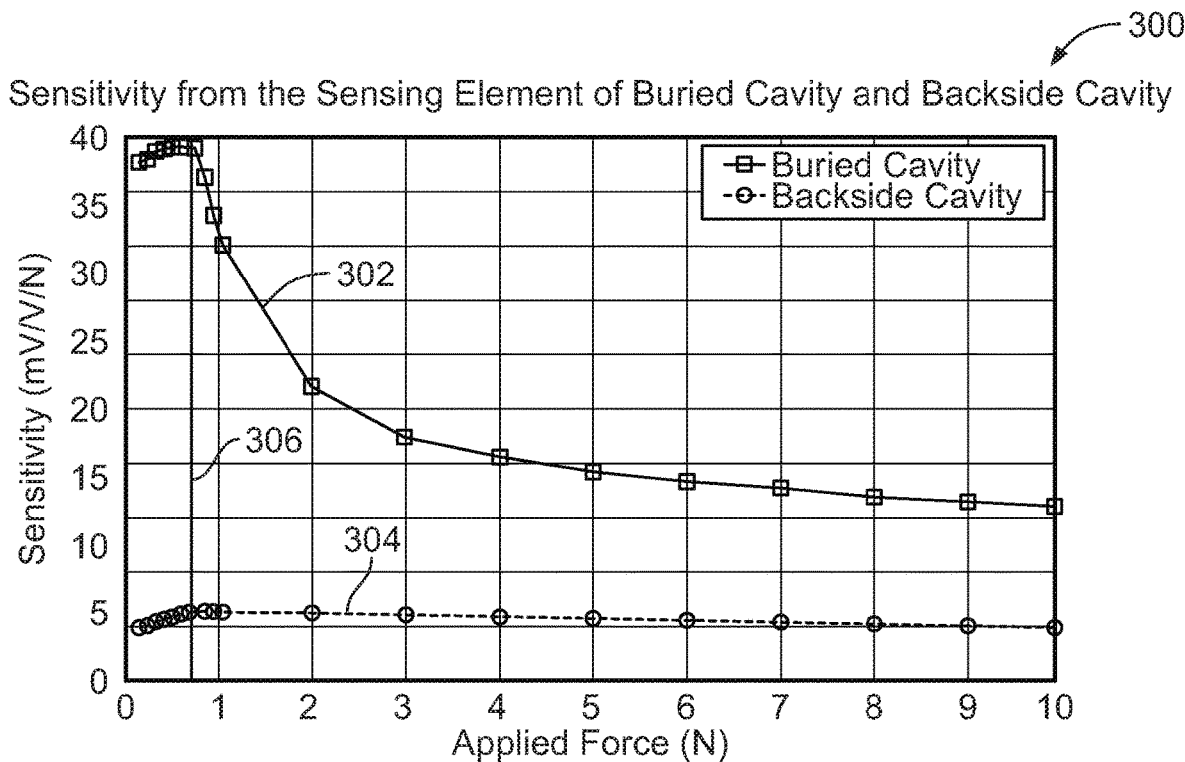
FIG. 5 is a graph that illustrates membrane sensitivity characteristics as a function of applied force for an example sensor assembly as disclosed herein.

FIG. 5 is a graph 300 that illustrates the sensitivity amounts of the first and second diaphragms or membranes as a function of applied force. The sensitivity characteristics of the first membrane is shown by plot 302, and the sensitivity characteristics of the second membrane is shown by plot 304. As illustrated, with increasing applied force starting at zero one can see from plot 302 that the first membrane has a relatively greater level of sensitivity than the second membrane. There is a point on the graph noted by a vertical line 306 at about 0.7 N that denotes where the first membrane contacts the buried cavity that operates to limit further free deflection of the first membrane (which condition is disclosed above and illustrated in FIG. 3C). Continuing from this point, plot 302 illustrates a rapid decrease in the sensitivity of the first membrane, which in contrast plot 304 illustrates almost a straight-line or linear sensitivity level as a function of increasing applied force. For purposes of measurement accuracy, such linear sensitivity characteristic displayed by the second membrane is desired. Accordingly, this graph operates to show the sensor assembly first and second membrane sensitivity characteristics along a range of applied force (in this example from zero to about 0.7 N through the sensitivity of the first membrane, and from about 0.7 to 10 N through the sensitivity of the second membrane), thereby operating to accurately provide information for determining the force that is applied thereon across a range of force pressures.

Features of sensor assemblies as disclosed herein include a construction that facilitates force determination over a range of forces not otherwise possible with conventional sensor assemblies through the use of a first membrane and buried cavity and a second membrane and backside cavity. Such sensor assemblies may be custom tailored, e.g., through the sizing of the first and second membranes, the depth of the buried cavity, and/or depth of the backside cavity to provide a desired degree of measurement accuracy within different regions of a force range. Further, such sensor assemblies operate to physically limit the degree of first membrane deflection through the presence of the buried cavity, i.e., by making contact therewith), thereby minimize possible tearing or other failure of the first membrane during use that may increase effective sensor assembly service life. Further, sensor assemblies as disclosed herein, while described in the context of functioning as a force sensor, may be used in other applications such as a pressure sensor and the like.

While certain types and constructions of sensor assemblies have been disclosed and illustrated, it is to be understood that such examples have been provided for purposes of reference and illustration, and that sensor assemblies as disclosed herein should not be limited to the particular embodiments discussed above. Thus, sensor assembly embodiments other than those discussed and illustrated, while made and comprising the above-noted features as disclosed herein are understood to be within the scope of this description. For example, it is understood that all types of MEMS sensor assemblies comprising diaphragms or membranes exposed to external forces being measured comprising such sensor assembly elements and features and features are intended to be within the scope of sensor assemblies as disclosed herein and as defined by the following claims.

What is claimed is:

1. A sensor device comprising:
   a sensor die comprising:
   a first membrane disposed between a first outside surface of the sensor die and a buried cavity disposed in the sensor die, wherein the first membrane is configured to deflect into the buried cavity in response to an external force disposed thereon;
   a second membrane disposed between the buried cavity and a recessed section of a second outside surface of the sensor die that is opposite the first outside surface, wherein the second membrane is configured to deflect by contact from the first membrane when the first membrane is deflected in response to an external force of a determined force amount; and
   electrical sensing elements disposed within the sensor die for measuring movement of the first and second membranes.

2. The sensor device as recited in claim 1 wherein the electrical sensing elements comprise a first set of electrical sensing elements positioned adjacent the first membrane, and a second set of electrical sensing elements positioned adjacent the second membrane.

3. The sensor device as recited in claim 1 wherein the sensor device further comprises electrical contacts exposed along the first outside surface of the sensor die that are electrically connected with the electrical sensing elements.

4. The sensor device as recited in claim 1 wherein the electrical sensing elements are disposed within a region of the sensor die that is interposed between the first outside surface and the buried cavity.

5. The sensor device as recited in claim 1 wherein the first membrane is sized having a length that is different from that of the second membrane.

6. The sensor device as recited in claim 1 wherein the first membrane has a thickness that is different from a thickness of the second membrane.

7. The sensor device as recited in claim 1 wherein the buried cavity includes a port extending to an environment outside of the sensor die.

8. The sensor device as recited in claim 1 wherein the sensor die comprises a first member and a second member that are attached together, wherein the buried cavity is formed between the first and second members, and wherein the first membrane is integral with the first member.

9. The sensor device as recited in claim 8 wherein the second membrane is integral with the second member.

10. A sensor device comprising:
a sensor die comprising first and second members and a buried cavity disposed between the first and second members:
a first membrane disposed within the sensor die and extending between an outer surface of the first member and the buried cavity, wherein the first membrane is configured to deflect into the buried cavity in response to receiving an external force at a first force amount;
a second membrane disposed within the sensor die second member and vertically aligned with the first membrane, wherein the buried cavity is interposed between the first and second membranes, and wherein the second membrane is configured to deflect in response to contact from the first membrane when the first membrane receives an external force at a second force amount; and
electrical sensing elements disposed within the sensor die and positioned for measuring movement of the respective first and second membranes in response to an external force being imposed on the first membrane.

11. The sensor device as recited in claim 10 wherein the second membrane extends along a recessed section of an outside surface of the second member, and wherein the recessed section forms a backside cavity.

12. The sensor device as recited in claim 10 wherein the buried cavity is formed between a recessed section along an underside surface of the second member and an adjacent underside surface of the first member.

13. The sensor device as recited in claim 12 wherein the first membrane has a thickness that is approximately a thickness of the first member.

14. The sensor device as recited in claim 10 wherein the second membrane has a thickness that is less that the total thickness of the second member.

15. The sensor device as recited in claim 10 wherein the electrical sensing elements are disposed within the first member.

16. The sensor device as recited in claim 10 wherein the electrical sensing elements comprise a first set of electrical sensing elements positioned adjacent the first membrane and a second set of electrical sensing elements positioned adjacent the second sensing membrane.

17. The sensor device as recited in claim 10 wherein the first membrane has a length that is different than a length of the second membrane.

18. A method for sensing a force comprising:
subjecting an external force onto a sensor device comprising a sensor die having disposed therein a first membrane and a second membrane that is in alignment with the first membrane, wherein sensor die comprises a buried cavity adjacent the first membrane, and wherein the external force is directed onto the first membrane and the first membrane is configured to deflect into the buried cavity in depending on the external force amount, and wherein the second membrane is configured to deflect when contacted by the first membrane depending on the external force amount;
detecting an amount that one or both of the first membrane and second membrane deflects in response to the external force from electrical sensing elements disposed within the sensor die; and
determining the amount of the external force from an output of the electrical sensing elements as transferred from the sensor device through electrical contacts disposed on a surface of the sensor die.

19. The method as recited in claim 18, wherein the first membrane is configured to detect external forces within a first range of external force amounts, and the second membrane is configured to detect external forces within a second range of external force amounts that are different from the first range of external force amounts.

20. The method as recited in claim 18, wherein the sensor die comprises first and second members that are joined together, wherein the first membrane extends along a thickness of the first member, and wherein the second membrane is disposed in the second member and extends between the buried cavity and a recessed section of the second member.

* * * * *